US011613625B2

(12) United States Patent
Hagimoto et al.

(10) Patent No.: US 11,613,625 B2
(45) Date of Patent: Mar. 28, 2023

(54) FILLER FOR RESINOUS COMPOSITION, FILLER-CONTAINING SLURRY COMPOSITION AND FILLER-CONTAINING RESINOUS COMPOSITION

(71) Applicant: ADMATECHS CO., LTD., Miyoshi (JP)

(72) Inventors: Shinta Hagimoto, Miyoshi (JP); Nobutaka Tomita, Miyoshi (JP); Osamu Nakano, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 135 days.

(21) Appl. No.: 16/921,334

(22) Filed: Jul. 6, 2020

(65) Prior Publication Data

US 2020/0332082 A1     Oct. 22, 2020

Related U.S. Application Data

(63) Continuation-in-part of application No. 16/597,110, filed on Oct. 9, 2019, now abandoned, which is a continuation of application No. PCT/JP2017/027489, filed on Jul. 28, 2017.

(30) Foreign Application Priority Data

Apr. 10, 2017    (JP) .............................. JP2017-077865

(51) Int. Cl.
| | |
|---|---|
| *C08K 9/06* | (2006.01) |
| *C08K 3/34* | (2006.01) |
| *C08K 7/18* | (2006.01) |
| *C09C 1/40* | (2006.01) |
| *C09C 3/12* | (2006.01) |

(52) U.S. Cl.
CPC .................. *C08K 3/34* (2013.01); *C08K 7/18* (2013.01); *C08K 9/06* (2013.01); *C09C 1/405* (2013.01); *C09C 3/12* (2013.01); *C01P 2004/32* (2013.01); *C01P 2004/61* (2013.01); *C01P 2004/62* (2013.01); *C01P 2006/32* (2013.01); *C08K 2003/343* (2013.01); *C08K 2201/005* (2013.01)

(58) Field of Classification Search
CPC ..................................... C08K 9/06; C09C 3/12
USPC .................................................. 524/442–450
See application file for complete search history.

(56) References Cited

U.S. PATENT DOCUMENTS

| | | | | |
|---|---|---|---|---|
| 6,508,860 | B1* | 1/2003 | Kulkarni | ............. B01D 69/145 |
| | | | | 96/14 |
| 7,560,094 | B2 | 7/2009 | Tatsumi et al. | |
| 9,415,351 | B2 | 8/2016 | Lee et al. | |
| 2006/0105903 | A1 | 5/2006 | Tatsumi et al. | |
| 2010/0068474 | A1* | 3/2010 | Sauer | ..................... B01D 53/02 |
| | | | | 428/195.1 |
| 2010/0096173 | A1 | 4/2010 | Fujino et al. | |
| 2013/0131232 | A1 | 5/2013 | Sooknoi et al. | |
| 2015/0321151 | A1 | 11/2015 | Lee et al. | |
| 2019/0255519 | A1 | 8/2019 | Ostraat et al. | |
| 2021/0017392 | A1* | 1/2021 | Hagimoto | ................. C09C 3/12 |

FOREIGN PATENT DOCUMENTS

| | | |
|---|---|---|
| CN | 1747900 A | 3/2006 |
| CN | 101117418 A | 2/2008 |
| CN | 101170964 A | 4/2008 |
| CN | 102212250 A | 10/2011 |
| CN | 103906561 A | 7/2014 |
| JP | S62-7747 A | 1/1987 |
| JP | S62-7748 A | 1/1987 |
| JP | H06-183728 A | 7/1994 |
| JP | 2001-115048 A | 4/2001 |
| JP | 2002-20111 A | 1/2002 |
| JP | 4766852 B2 | 9/2011 |
| JP | 5192259 B2 | 5/2013 |
| JP | 2015-13789 A | 1/2015 |
| JP | 2015-214440 A | 12/2015 |
| JP | 2016-172689 A | 9/2016 |
| JP | 6441525 B2 | 12/2018 |
| JP | 2019-115876 | * 7/2019 |
| WO | WO 2019/194321 A1 | * 10/2019 |

OTHER PUBLICATIONS

Machine translation for JP 2019-115876 (no date).*
Julbe A., Drobek M. (2014) Zeolite X: Type.In.: Drioli E., Giorno L. (eds) Encyclopedia of Membranes, Springer, Berlin, Heidelberg. httpS//doi.org/10.1007/978-3-642-40872-4 607-1.*
Atlas of Zeolite Framework Types, sixth revised edition 2007 Baerlocker et al. Copyright 2007 Elsevier B.V.*
International Search Report dated Oct. 31, 2017 in PCT/JP2017/027489 (w/ English translation),citing References AN-AQ.
Written Opinion of ISA dated Oct. 31, 2017 in PCT/JP2017/027489 (w/ English translation).
Notification of Reasons for Refusual dated Jul. 3, 2018 in Japanese Patent Application No. 2018-075757 (w/ computer-generated English translation).
Decision to Grant dated Nov. 6, 2018 in Japanese Patent Application No. 2018-075757 (w/ computer-generated English translation).
1st Office Action dated Dec. 7, 2018 in Taiwan Patent Application No. 107111769 (w/ computer-generated English translation), citing References AR-AU.

(Continued)

*Primary Examiner* — Marc S Zimmer
(74) *Attorney, Agent, or Firm* — Oblon, McClelland, Maier & Neustadt, L.L.P.

(57) ABSTRACT

A filler for resinous composition is contained and used in resinous composition, and includes: a crystalline siliceous particulate material with a crystal structure made of at least one member selected from the group consisting of type FAU, type FER, type LTA and type MFI, and/or type MWW; and a surface treatment agent including an organic silica compound reacted with or adhered to a surface of the crystalline siliceous particulate material; the filler including the surface treatment agent in an amount falling in a range allowing the filler to exhibit a negative thermal expansion coefficient.

20 Claims, 7 Drawing Sheets

(56) References Cited

OTHER PUBLICATIONS

Combined Chinese Office Action and Search Report dated Oct. 12, 2020 in corresponding Chinese Patent Application No. 201780089370.9 (with English Translation and English Translation of Category of Cited Documents) citing documents therein, AA, AO-AR, AX and AY, 12 pages.

Yu Shouwu et al., "Modification Principle and Technology of Polymer", Intellectual Property Publishing House, (2015), pp. 295-299.

Koshi Takenaka et al., "Thermal expansion adjustable polymer matrix composites with giant negative thermal expansion filler", Composites Science and Technology, vol. 104, (2014), p. 47-51.

* cited by examiner

Fig. 1

Source : The Database of International Zeolite Association

FILLER FOR RESINOUS COMPOSITION, FILLER-CONTAINING SLURRY COMPOSITION AND FILLER-CONTAINING RESINOUS COMPOSITION

CROSS REFERENCE TO RELATED APPLICATIONS

The present application is a continuation-in-part of and claims the benefit of priority to U.S. application Ser. No. 16/597,110, filed Oct. 9, 2019, which is a Continuation Application of International Application No. PCT/JP2017/027489, filed on Jul. 28, 2017, which is incorporated herein by reference. The present invention is based on Japanese Patent Application No. 2017-077865, filed on Apr. 10, 2017, the entire contents of which are incorporated herein by reference.

BACKGROUND OF THE INVENTION

1. Field of the Invention

The present invention relates to a filler for resinous composition, the filler contained and used in resinous composition; a filler-containing slurry composition containing the filler; and a filler-containing resinous composition containing the filler.

2. Description of the Related Art

Conventionally, resinous compositions used for electronic packaging material, such as printed-circuit boards, epoxy molding compounds and liquid encapsulants, have been mixed with inorganic particles serving as fillers, for the purpose of adjusting their thermal expansion coefficient, and the like. Amorphous silica particles have been used mainly as the fillers because they exhibit a low thermal expansion coefficient, and have good insulating properties.

In recent years, accompanied by the requirements of providing electronic devices with high functionalities, developments have been underway in further thinning and highly densifying semiconductor packages, so the thermal expansions and warpages of semiconductor packages have come to affect the reliability of electronic devices more greatly. Hence, Japanese Patent Gazette No. 5192259 discloses an investigation that was carried out to lower the thermal expansion coefficients of cured substances, which make resinous compositions used for printed-circuit board, epoxy molding compounds and liquid encapsulants, so as to reduce the thermal expansions and warpages.

The present invention has been made in view of the aforementioned circumstances. It is therefore an object of the present invention to provide a filler for resinous composition, the filler enabling resinous compositions containing the filler to exhibit a lowered thermal expansion coefficient.

SUMMARY OF THE INVENTION

In order to achieve the aforementioned object, the present inventors studied an application of materials, whose thermal expansion coefficient is lower than that of amorphous silica and which exhibit a negative thermal expansion coefficient and contract upon being subjected to heat, to filler materials. Japanese Unexamined Patent Publication (KOKAI) Gazette No. 2015-214440 and Japanese Patent Gazette No. 4766852 disclose materials with a negative thermal expansion coefficient that involve particles composed of β-eucryptite (Li-AlSiO$_4$) or zirconium tangstate (ZrW$_2$O$_8$). However, the β-eucryptite poses a problem of insufficient electric properties, because it contains Li as a major constituent element and diffusing Li ions lower its insulation properties. The zirconium tangstanate has been studied variously; however, it requires longer time and huge costs for the synthesis. Many reports are made on the zirconium tangstanate produced at experimental laboratory level, but no method has been established yet for producing it industrially.

Next, among siliceous materials, crystalline siliceous materials have a crystal structure made of at least one member selected from the group consisting of type FAU, type FER, type LTA and type MFI, and/or type MWW, and exhibit a negative thermal expansion coefficient. However, it has become apparent that the crystalline siliceous materials dispersed in resinous materials promote or accelerate yellowing of the resinous materials.

As a result of investigating the accelerated yellowing, the present inventors understood that hydroxy groups, which are derived from aluminum element that the crystalline siliceous materials include, turn into active sites that affect resinous materials. Hence, the present inventors found out that treating the crystalline siliceous materials with a surface treatment agent comprising an organic silicon compound allows deactivation of the active sites derived from aluminum element, one of the causes of yellowing resinous materials, and thereby permitting inhibition of the yellowing. Moreover, the present inventors discovered that the crystalline siliceous materials are capable of keeping their thermal expansion coefficient falling within a negative range even when their surface is provided with a layer derived from the surface treatment agent to such an extent as allowing inhibition of the yellowing.

The present invention has been completed based on the aforementioned knowledge. A filler for resinous composition according to the present invention achieving the aforementioned object is contained and used in resinous composition, and comprises:

a crystalline siliceous particulate material with a crystal structure made of at least one member selected from the group consisting of type FAU, type FER, type LTA and type MFI, and/or type MWW; and a surface treatment agent including an organic silica compound reacted with or adhered to a surface of the crystalline siliceous particulate material;

the filler including the surface treatment agent in an amount falling in a range allowing the filler to exhibit a negative thermal expansion coefficient.

Note herein that the organic silicon compound preferably includes silazane, and/or at least one member selected from the group consisting of silane coupling agents. Employing one of these compounds as a surface treatment agent allows effectively inhibiting resinous materials from yellowing.

Moreover, the present filler preferably has an aluminum element content of 12% or less based on the entire mass. The thus reduced content of original aluminum element, a cause of yellowing, allows effectively inhibiting resinous materials from yellowing.

In addition, the crystalline siliceous material classified as type FAU is optimum for the purpose of inhibiting resinous compositions from thermally expanding, because it exhibits a highly negative thermal expansion coefficient.

Moreover, the filler for resinous composition according to the present invention is preferably contained and used in resinous compositions for use in materials for packaging, assembling or mounting electronic parts. A resinous composition exhibiting a large thermal expansion efficient expands in the facial (or lateral and longitudinal) directions to cause cracks in solder connections, or expands in the thickness direction to cause failure conductions between the layers of printed-circuit boards. In addition, members having a large difference between their thermal expansion coefficients are likely to generate warpages in semiconductor packages. Lowering the thermal expansion coefficients allows inhibiting these drawbacks from occurring. Moreover, the use of the present filler also promises one to produce resinous compositions whose resin containing proportion is high, and which are favorable in adhesion properties and cured or semi-cured machining properties, because the use of the present filler allows achieving a desired thermal expansion coefficient with a lesser filler compounding proportion compared with the sole or individual use of conventional fillers exhibiting a positive thermal expansion coefficient.

Combining the filler for resinous composition according to the present invention with a solvent dispersing the present filler enables the present filler to be used as a filler-containing slurry composition; or combining the present filler with a resinous material dispersing the present filler enables the present filler to be used as a filler-containing resinous composition.

The filler for resinous composition according to the present invention constructed as aforementioned exhibits a negative thermal expansion coefficient, and effects an advantage of affecting resins less adversely.

DESCRIPTION OF THE EMBODIMENTS

A filler for resinous composition according to the present invention aims at making its thermal expansion coefficient as small as possible, thereby enabling a resinous composition produced by including the present filler to exhibit a diminished thermal expansion coefficient. Hereinafter, the present filler will be described based on some of its embodiments.

A filler for resinous composition according to an embodiment of the present invention is used for the purpose of forming resinous compositions by dispersing it in resinous materials. Although the resinous material to be combined with the present filler is not limited especially, an exemplifiable resinous material involves thermosetting resins (including those prior to curing), such as epoxy resins, silicone resins, or phenol resins, and thermoplastic resins, such as polyesters, acrylic resins or polyolefins. Moreover, in addition to the filler according to the present embodiment, the resinous composition also satisfactorily contains other fillers. Note that it does not matter whatever forms, such as powdery or particulate bodies or fibrous bodies, the other fillers have. For example, the resinous composition even competently further contains inorganic substances, such as amorphous silica, alumina, aluminum hydroxide, boehmite, aluminum nitride, boron nitride or carbon materials; or organic substances composed of secondary or auxiliary resinous materials (those with fibrous or particulate shapes) for dispersing fillers, other than the aforementioned resinous material serving as a matrix. Note that it is unnecessary to definitely distinguish the auxiliary resinous materials from the resinous materials serving as a matrix, and it is also difficult to make the distinction. The present filler exhibiting a negative thermal expansion coefficient allows produced resinous compositions to exhibit a lessened or diminished thermal expansion coefficient, even when they contain the additional fillers or auxiliary resinous materials that exhibit a positive thermal expansion coefficient.

The filler for resinous composition according to the present embodiment is preferably free from any one of silver, copper, zinc, mercury, tin, lead, bismuth, cadmium, chromium, cobalt, and nickel that are exposed in the surface. These metals exposed in the surface might be eluted as impurities when resinous compositions filled with the present filler make contact with liquids.

Although a proportion of the filler for resinous composition according to the present embodiment, which produced resinous compositions contain, is not limited especially, an increased proportion permits eventually available resinous compositions to exhibit a lessened or diminished thermal expansion coefficient. For example, the present embodiment allows setting the content at from 5% to 85% approximately based on the entire mass of the resinous composition.

A method of dispersing the filler for resinous composition according to the present embodiment in a resinous material is not limited especially. However, the present filler is mixed satisfactorily with a resinous material under dry condition. Alternatively, the present filler is also competently first dispersed in a certain solvent serving as a dispersion medium to turn it into a slurry, and is then mixed with a resinous material.

Figure 1:
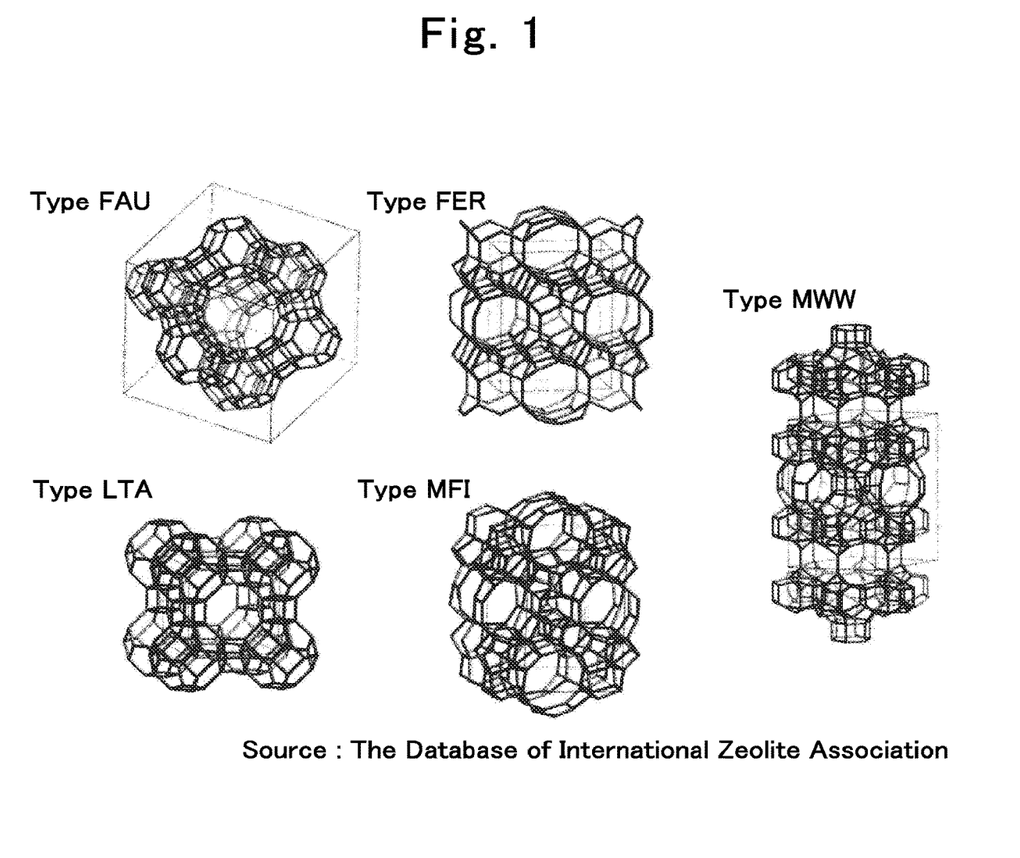
FIG. 1 is a diagram illustrating crystalline backbone structures of crystalline siliceous particulate materials according to the present invention.
Figure 2:
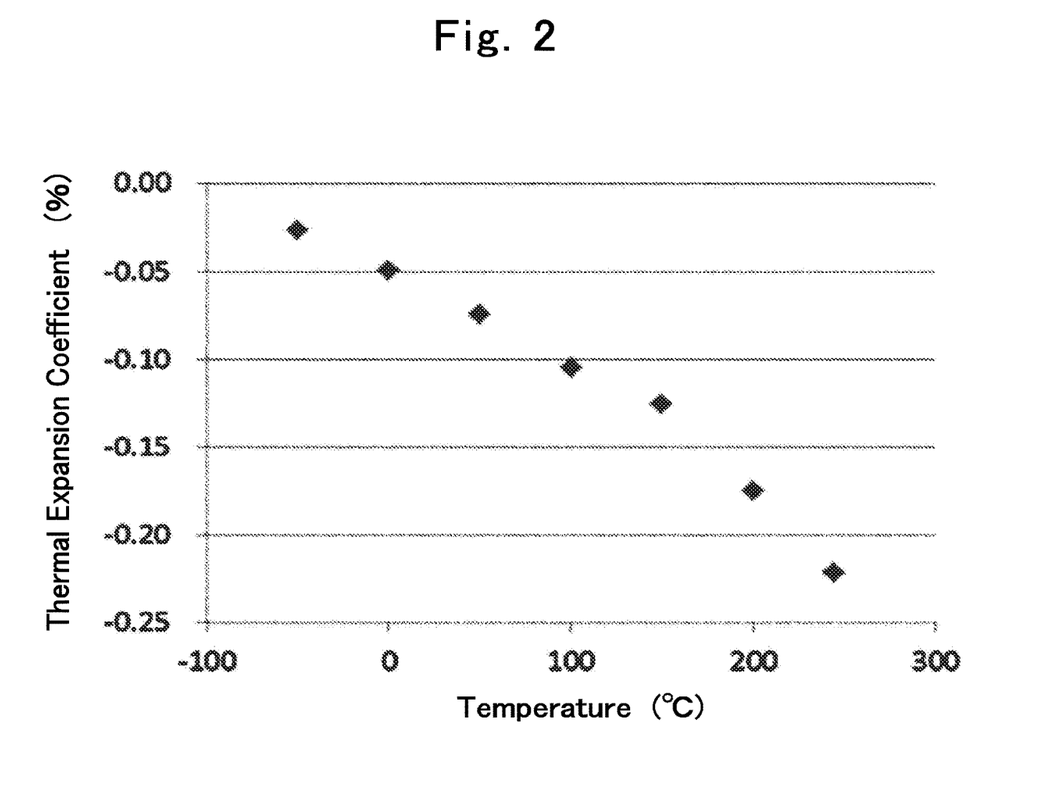
FIG. 2 is a diagram illustrating the results of a measurement in which a filler for resinous composition according to Test Example No. 2, a second example of the present invention, was observed for its thermal expansion coefficient.
Figure 3:
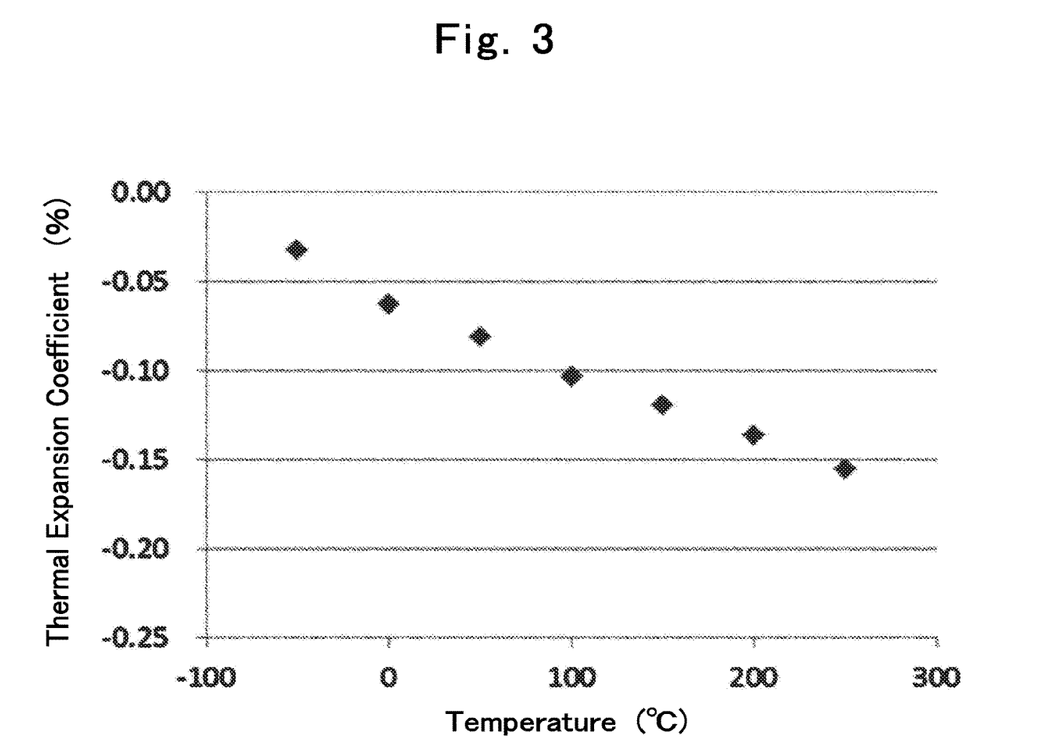
FIG. 3 is a diagram illustrating the results of a measurement in which a filler for resinous composition according to Test Example No. 6, a sixth example of the present invention, was observed for its thermal expansion coefficient.
Figure 4:
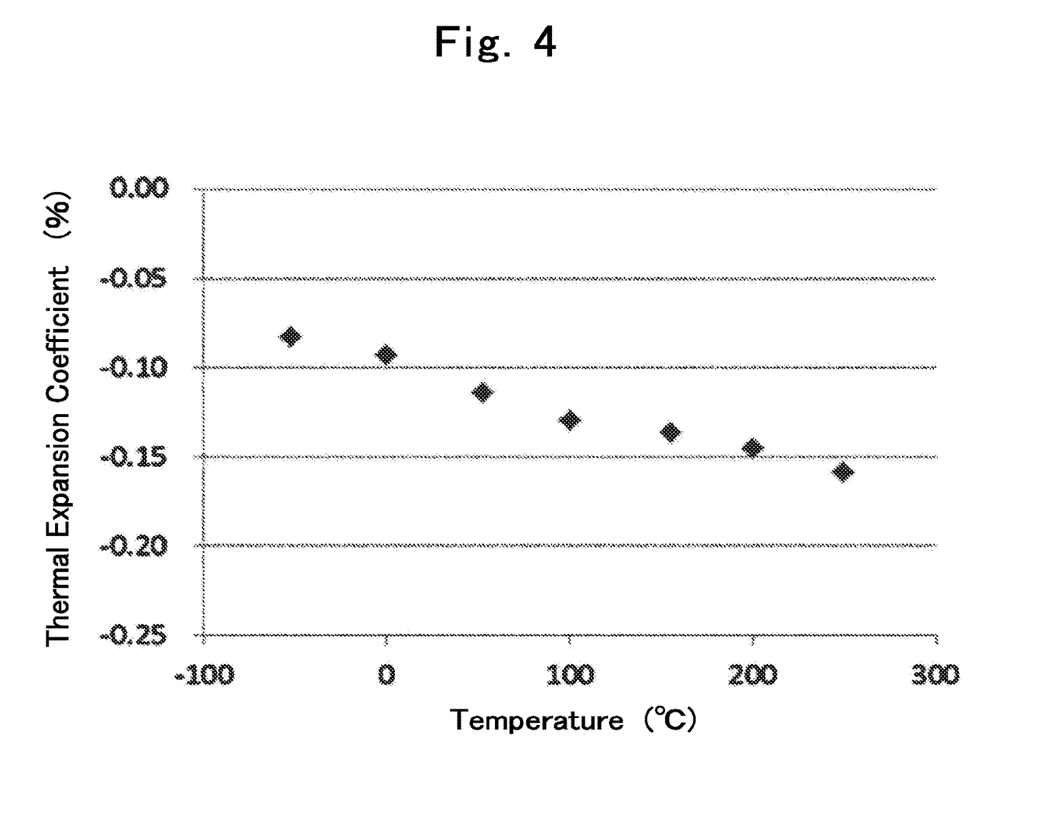
FIG. 4 is a diagram illustrating the results of a measurement in which a filler for resinous composition according to Test Example No. 7, a seventh example of the present invention, was observed for its thermal expansion coefficient.
Figure 5:
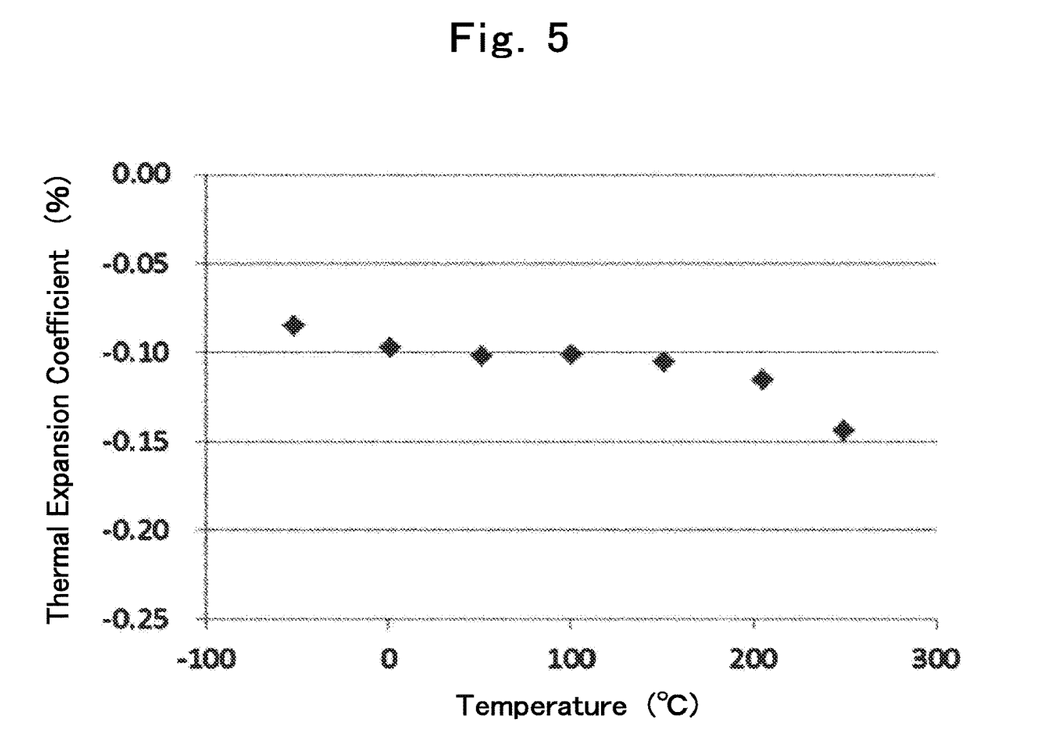
FIG. 5 is a diagram illustrating the results of a measurement in which a filler for resinous composition according to Test Example No. 8, an eighth example of the present invention, was observed for its thermal expansion coefficient.
Figure 6:
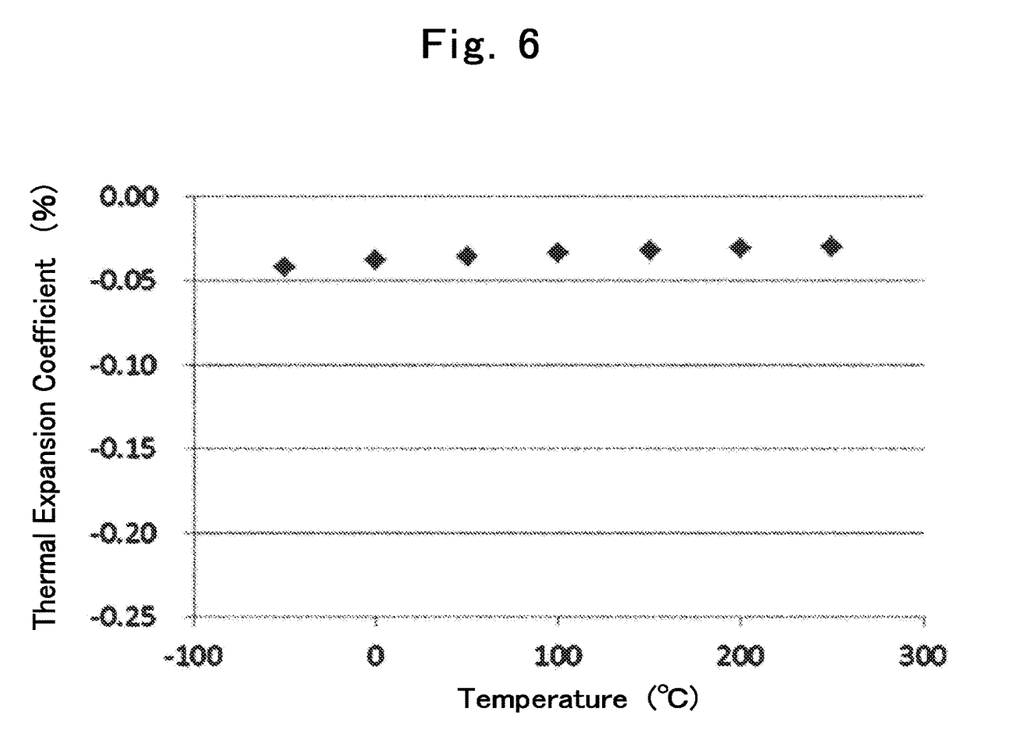
FIG. 6 is a diagram illustrating the results of a measurement in which a filler for resinous composition according to Test Example No. 13, a thirteenth example of the present invention, was observed for its thermal expansion coefficient.

The filler for resinous composition according to the present embodiment comprises a crystalline siliceous particulate material, and a surface treatment agent for surface treating the crystalline siliceous particulate material. The crystalline siliceous particulate material has a crystal structure made of at least one member selected from the group consisting of type FAU, type FER, type LTA and type MFI, and/or MWW type. The crystalline siliceous particulate material with one of these crystal structures exhibits a negative thermal expansion coefficient. In particular, the crystalline siliceous particulate material preferably has a type FAU crystal structure. Note that it is not essential that all of the crystalline siliceous particulate material has one of the crystal structures. That is, the crystalline siliceous particulate material with one of the crystal structures satisfactorily accounts for 50%, or more preferably 80% or more, based on the entire mass. Notice herein that FIG. 1 illustrates crystalline backbone structures expressed with three alphabetical letters.

The crystalline siliceous particulate material has such an extent of grain size distribution or particulate configuration that allows the crystalline siliceous particulate material contained in a resinous composition to express needed properties. For example, a produced resinous composition, which is used for semiconductor encapsulant, is preferably free from the crystalline siliceous particulate material whose particle diameter is larger than that of interstices into which the semiconductor encapsulant penetrates. Specifically, the crystalline siliceous particulate material preferably has a particle diameter of from 0.5 µm to 50 µm approximately, and is more preferably free from coarse particles whose particle diameter is 100 µor more. Moreover, a produced resinous composition, which is used for printed-circuit board, is preferably free from the crystalline siliceous particulate material whose particle diameter is larger than a thickness of insulation layer that the printed-circuit board has. Specifically, the crystalline siliceous particulate material preferably has a particle diameter as from 0.2 µm to 5 µm approximately, and is more preferably virtually free from coarse particles whose particle diameter is 10 µm or more. In addition, the crystalline siliceous particulate material preferably has a particulate configuration whose aspect ratio is low, and more preferably has a spherical shape.

Using a crystalline siliceous material with one of the compatible crystal structures as a raw material, and subjecting it to one or more of operations, like pulverization, classification and granulation, independently or combinedly allow the production of the crystalline siliceous particulate material. Moreover, employing proper conditions for the operations, and performing the operations in an appropriate number of times permit the provision of the crystalline siliceous particulate material with necessary grain size distribution or particulate configuration. In addition, an ordinary method (e.g., hydrothermal synthesis method) allows the synthesis of the crystalline siliceous material per se making a raw material for the filler according to the present embodiment.

The crystalline siliceous particulate material preferably has an aluminum element content of 12% or less, more preferably 8% or less, much more preferably 4% or less, based on the entire mass. Note that the crystalline siliceous particulate material is presumed to preferably hold aluminum in it in an amount close to 0%, but many of crystalline siliceous particulate materials contain aluminum inevitably at present.

The surface treatment agent preferably includes an organic silicon compound. Reacting the surface treatment agent including an organic silicon compound with or adhering it to a surface of the crystalline siliceous particulate material allows preventing active sites, which accelerates yellowing, from making contact with resin. In particular, the surface treatment agent preferably includes a silane compound. Moreover, among silane compounds, using silane coupling agents and silazanes enables the surface treatment agent to firmly unite with a surface of the crystalline siliceous particulate material. In addition, among the silane compounds, employing silane compounds with functional groups whose affinity to resinous materials is high is possible, because they improve affinity between the crystalline siliceous particulate material and mixed resinous materials as well as they are capable of shielding yellowing active sites in the crystalline siliceous particulate material.

Preferable silane compounds with functional groups whose affinity to resinous materials is high involve silane compounds that have at least one member selected from the group consisting of phenyl groups, vinyl groups, epoxy groups, methacryl groups, amino groups, ureido groups, mercapto groups, isocyanate groups, acrylic groups and alkyl groups. Moreover, even among the preferable silane compounds, exemplifiable silazanes involve 1,1,1,3,3,3-hexamethyldisilazane.

Conditions under which treating the crystalline siliceous particulate material with the surface treatment agent are not at all limited especially. For example, one of the conditions may possibly involve the crystalline siliceous particulate material covered with the surface treatment agent in an area of 50% or more, preferably 60% or more, more preferably 80% or more, based on an imaginary surface area calculated from an average particle diameter obtained on the assumption that the crystalline siliceous particulate material is an ideal sphere. Note that the area covered with the surface treatment agent is a value calculated from a molecular size and processed amount of the surface treatment agent that are assumed to adhere to or react with a surface of the crystalline siliceous particulate material in a single-layered manner. Another one of the conditions may possibly involve an amount of the surface treatment agent depending on the amount of aluminum element that exists in a surface of the crystalline siliceous particulate material. For example, the amount of the surface treatment agent may possibly be set at an amount that is excessive to the amount of aluminum element existing in a surface of the crystalline siliceous particulate material, or at such an amount that makes the inhibition of yellowing appreciable. In general, as for an upper limit of the amount of the surface treatment agent, the higher the upper limit is, the more the surface treatment agent allows the inhibition of adverse effects to resins; but too much amount of the surface treatment agent might possibly keep the filler for resinous composition according to the present embodiment from exhibiting a negative thermal expansion coefficient. Accordingly, an upper limit of the amount of the surface treatment agent is set to fall in such a range as the present filler exhibits a negative thermal expansion coefficient.

Whatever method is satisfactorily employed for performing the surface treatment to the crystalline siliceous particulate material. Bringing the surface treatment agent per se into contact with the crystalline siliceous particulate material, or bringing a solution in which the surface treatment agent is solved in a certain solvent into contact with the crystalline siliceous particulate material, enables the surface treatment agent to adhere onto a surface of the crystalline siliceous particulate material. Moreover, an operation, like heating the crystalline siliceous particulate material with the surface treatment agent adhered, also allows accelerating reactions of the adhered surface treatment agent with the crystalline siliceous particulate material.

EXAMPLES (1) Evaluation on Resin for Oxidation

A silazane, and silane coupling agents were added to crystalline siliceous particulate materials "A" through "D"

with physical properties shown in Table 1 so as to make compositions shown in Table 2. Thereafter, fillers for resinous composition according to Test Example Nos. 1 through 13 of the present invention were produced by subjecting the ingredients to mixing with a mixer for mixing powder followed by drying to complete a surface treatment. The thus made present fillers according to Test Example Nos. 1 through 13 were mixed with a liquid epoxy resin serving as a resinous material so as to attain a filler filling rate of 25% by mass. Note that the liquid epoxy resin was a mixture of bisphenol-A and bisphenol-F in which the ratio of the former to the latter was 50:50 by mole. After holding the resulting mixtures at 25° C. for 24 hours, they were evaluated for an oxidation degree of the resinous material by changes in their hue. The mixtures undergone reddening were labeled "poor"; those undergone light discoloration from yellowing to reddening were labeled "satisfactory"; and those showing no appreciable discoloration were labeled "good." Table 2 shows the results.

TABLE 1

| | Volume Average Particle Diameter (μm) | Crystal Structure | Al Content (% by mass) |
|---|---|---|---|
| Siliceous Particulate Material "A" | 5.9 | Type FAU | 0.1 |
| Siliceous Particulate Material "B" | 2.1 | Type FAU | 0.9 |
| Siliceous Particulate Material "C" | 6.4 | Type FAU | 11.7 |
| Siliceous Particulate Material "D" | 3.6 | Type MFI | 0.05 |
| Siliceous Particulate Material "E" | 2.1 | Amorphous | 0.01 |

Thus, it was evidenced that the employment of the crystalline siliceous particulate materials develops the oxidation of the resinous material.

Hence, crystalline siliceous particulate materials, like the crystalline siliceous particulate materials "A" through "D," were found to develop the oxidation of the resinous material as they are. However, it became apparent that inhibiting the resinous material from oxidizing is made possible by subjecting even the crystalline siliceous particulate materials "A" through "D" to the surface treatment with the surface treatment agents, which are composed of the organic silane compounds, to turn the crystalline siliceous particulate materials "A" through "D" into the fillers that come under the claims of the filler for resinous composition according to the present invention. Note that it is understood that the less the aluminum content is the more it is possible to inhibit the resinous material from oxidizing, because the crystalline siliceous particulate materials "A," "B" and "D" (i.e., Test Example Nos. 2, 6 and 8), to which the surface treatment using the surface treatment agents was performed, were capable of inhibiting the resinous material from oxidizing more effectively than the crystalline siliceous particulate material "C" (i.e., Test Example No. 7).

(2) Evaluation on Thermal Expansion Coefficient

The fillers for resinous composition according to Test Example Nos. 2, 6, 7, 8 and 13 were evaluated for their thermal expansion coefficient. Test specimens for the measurement of thermal expansion coefficient were made by sintering the respective fillers for resinous composition at 800° C. for one hour using an SPS sintering machine. Each of the test specimens were measured for the thermal expansion coefficients at temperatures set within a range of from −50° C. to 250° C. with a measuring apparatus (e.g., a thermomechanical analyzer, "TMA-Q400EM," a product of TA Instruments). FIGS. 2 through 6 illustrate the results. Moreover, Table 2 above shows average values of the thermal expansion coefficients calculated from FIGS. 2 through 6.

TABLE 2

| Test Example | No. 1 | No. 2 | No. 3 | No. 4 | No. 5 | No. 6 | No. 7 | No. 8 | No. 9 | No. 10 | No. 11 | No. 12 | No. 13 |
|---|---|---|---|---|---|---|---|---|---|---|---|---|---|
| Siliceous Particulate Material "A" | 100 | 100 | 100 | 100 | 100 | | | | 100 | | | | |
| Siliceous Particulate Material "B" | | | | | | 100 | | | | 100 | | | |
| Siliceous Particulate Material "C" | | | | | | | 100 | | | | 100 | | |
| Siliceous Particulate Material "D" | | | | | | | | 100 | | | | 100 | |
| Siliceous Particulate Material "E" | | | | | | | | | | | | | 100 |
| Hexamethyl-disilazane | 3 | 6 | | | | 6 | 6 | 6 | | | | | |
| Glycidoxypropyl-trimethoxysilane | | | 3 | | | | | | | | | | |
| Vinyltrimethoxy-silane | | | | 3 | | | | | | | | | |
| Phenylamino-trimethoxysilane | | | | | 3 | | | | | | | | |
| Average Thermal Expansion Coefficient (ppm/K) | — | −6.6 | — | — | — | −4.1 | −2.5 | −2.0 | — | — | — | — | 0.4 |
| Oxidation of Resin | Good | Good | Good | Good | Good | Good | Satisfactory | Good | Poor | Poor | Poor | Poor | Good |

Table 2 shows clearly that Test Example No. 13, which used the amorphous siliceous particulate material (i.e., the siliceous particulate material "E") as the filler, did not result in appreciably oxidized resin (i.e., the "good" evaluation), whereas Test Example Nos. 9 through 12, which used the crystalline siliceous particulate materials (i.e., the siliceous particulate materials "A" through "D") as the filler, resulted in appreciably oxidized resin (i.e., the "poor" evaluation).

FIGS. 2 through 6 show apparently that, whereas Test Example No. 13 comprising the amorphous silica exhibited positive-value thermal expansion coefficients, any of Test Examples 2, 6, 7 and 8 exhibited negative-value thermal expansion coefficients. Moreover, Test Examples Nos. 2, 6 and 7 with type FAU crystal structure exhibited larger negative-value thermal expansion coefficients than did Test Example No. 8 with type MFI crystal structure. In addition, Test Example No. 8 with type MFI crystal structure exhibited enlarged negative thermal expansion coefficients at such higher temperatures as 100° C. or more. Moreover, the less the test specimens contained Al the larger absolute values of the negative thermal expansion coefficients they tended to exhibit.

(3) Evaluation on Thermal Expansion Coefficient of Resinous Composition

Figure 7:
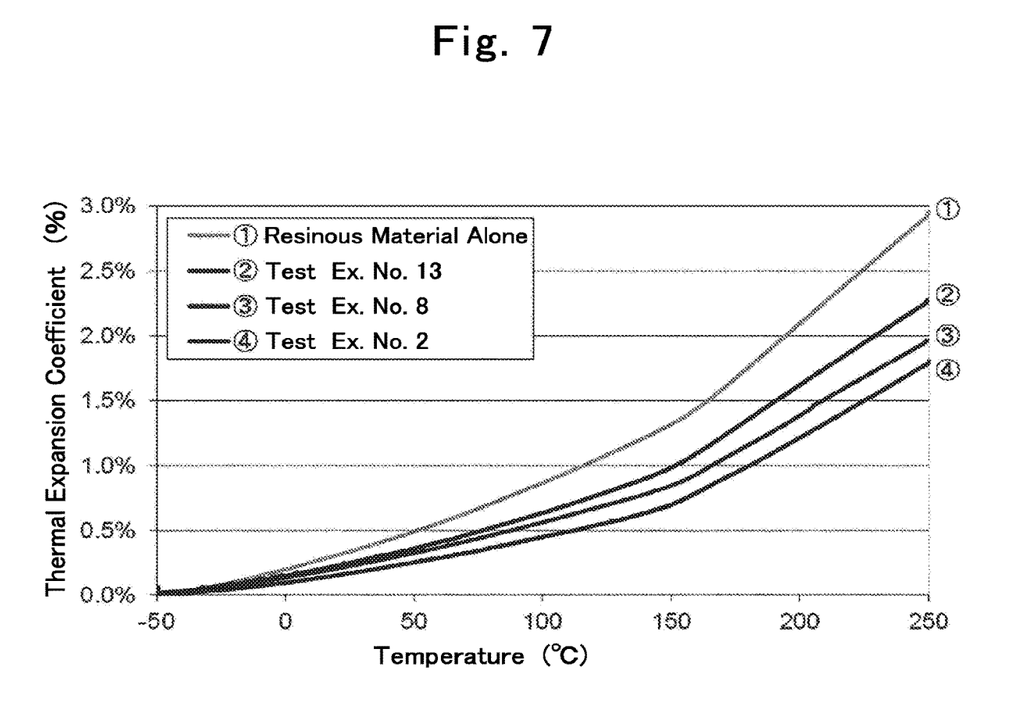
FIG. 7 is a diagram illustrating the results of an observation in which resinous compositions made by mixing the present fillers according to Test Example Nos. 2, 8 and 13, three representative examples of the present invention, were measured for their thermal expansion coefficient.

Next, the fillers for resinous composition according to Test Example Nos. 2, 8 and 13 were actually used to prepare resinous compositions to evaluate the resulting resinous compositions for their thermal expansion coefficient. Test specimens for measuring thermal expansion coefficient were formed of resinous cured substances which were made using the respective fillers according to Test Example Nos. 2, 8 and 13, a liquid epoxy resin and an amine-based curing agent. Note that the fillers according to Test Example Nos. 2, 8 and 13 were filled in the resinous cured substances so as to make a filler filling rate of 37.5% by mass. The liquid epoxy resin serving as the resinous material was a mixture of bisphenol-A and bisphenol-F in which the ratio of the former to the latter was 50:50 by mole. Each of the resultant test specimens were measured for the thermal expansion coefficient. FIG. 7 illustrates the results.

FIG. 7 clearly evidences that compounding or combining each of the fillers for resinous composition according to Test Example Nos. 2 and 8 with the resinous material keeps the resinous cured substances from thermally expanding, compared with the thermal expansion of the resinous cured substance made of the resinous material alone. In particular, both of the resinous compositions, in which the fillers according to Test Example Nos. 2 and 8 were mixed, were confirmed to be capable of inhibiting the thermal expansion of the cured substances from increasing more remarkably than did the resinous composition in which the filler according to Test Example No. 13 was mixed.

INDUSTRIAL APPLICABILITY

The filler for resinous composition according to the present invention exhibits a negative thermal expansion coefficient. Accordingly, the present filler mixed with resinous materials exhibiting a positive thermal expansion coefficient allows the cancelation or reduction of their positive thermal expansion coefficient. Consequently, the present filler permits manufacturers to produce resinous compositions whose thermal expansion coefficient is small, and which are of good thermal characteristic.

What is claimed is:
1. A composition, comprising:
a resinous material; and
a filler dispersed in the resinous material,
wherein the resinous material comprises at least one of a thermosetting resin, a polyester, and an acrylic resin,
the filler includes at least one crystalline siliceous particulate material which has a crystal structure of FAU, and is treated with a surface treatment agent comprising an organic silicon compound, and
the filler has an aluminum element content of 4% or less based on an entire mass of the filler.

2. The composition of claim 1, wherein the filler including the crystalline siliceous particulate material treated with the surface treatment agent exhibits a negative thermal expansion coefficient.

3. The composition of claim 1, wherein the organic silicon compound comprises at least one of a silazane and a silane coupling agent.

4. The composition of claim 1, wherein the organic silicon compound comprises at least one of 1,1,1,3,3,3-hexamethyldisilazane, glycidoxypropyltrimethoxysilane, vinyltrimethoxysilane, and phenylaminotrimethoxysilane.

5. The composition of claim 1, wherein the organic silicon compound comprises 1,1,1,3,3,3-hexamethyldisilazane.

6. A composition, comprising:
a resinous material; and
a filler dispersed in the resinous material,
wherein the resinous material comprises at least one of a thermosetting resin, a polyester, and an acrylic resin,
the filler includes at least one crystalline siliceous particulate material which has a crystal structure of FAU, FER, LTA, MFI, or MWW, and is treated with a surface treatment agent comprising an organic silicon compound,
the filler is included at 5% to 85% by mass based on an entire mass of the composition, and p1 the filler has an aluminum element content of 0.9% or less based on an entire mass of the filler.

7. The composition of claim 1, wherein the filler is included at 5% to 85% by mass based on an entire mass of the composition.

8. The composition of claim 1, wherein the filler is included at 25% to 85% by mass based on an entire mass of the composition.

9. The composition of claim 1, wherein the resinous material comprises a thermosetting resin which is cured or uncured.

10. A composition, comprising:
a resinous material; and
a filler dispersed in the resinous material,
wherein the filler includes at least one crystalline siliceous particulate material which has a crystal structure of FAU, FER, LTA, MFI, or MWW, and is treated with a surface treatment agent comprising an organic silicon compound,
the filler has an aluminum element content of 4% or less based on an entire mass of the filler, and
the resinous material comprises a thermosetting resin which is at least one of an epoxy resin, a phenol resin, and a silicone resin.

11. The composition of claim 1, wherein the crystalline siliceous particulate material has a volume average particle diameter of 0.5 μm-50 μm.

12. The composition of claim 1, wherein the crystalline siliceous particulate material has a volume average particle diameter of 2.1 μm-50 μm.

13. The composition of claim 1, wherein the crystalline siliceous particulate material has a volume average particle diameter of 2.1 μm-6.4 μm.

14. The composition of claim 1, wherein the crystalline siliceous particulate material is covered with the surface treatment agent in an area of 50% or more based on an imaginary surface area calculated from an average particle diameter obtained by assuming that the crystalline siliceous particulate material is an ideal sphere.

15. The composition of claim 1, wherein the crystalline siliceous particulate material is covered with the surface treatment agent in an area of 80% or more based on an imaginary surface area calculated from an average particle diameter obtained by assuming that the crystalline siliceous particulate material is an ideal sphere.

16. The composition of claim 10, wherein the organic silicon compound comprises at least one of 1,1,1,3,3,3-hexamethyldisilazane, glycidoxypropyltrimethoxysilane, vinyltrimethoxysilane, and phenylaminotrimethoxysilane.

17. The composition of claim 6, wherein the filler is included at 25% to 85% by mass based on the entire mass of the composition.

18. The composition of claim 6, wherein the organic silicon compound comprises at least one of 1,1,1,3,3,3-hexamethyldisilazane, glycidoxypropyltrimethoxysilane, vinyltrimethoxysilane, and phenylaminotrimethoxysilane.

19. The composition of claim 10, wherein the crystalline siliceous particulate material has a crystal structure of FAU.

20. The composition of claim 10, wherein the aluminum element content of the filler is 0.9% or less based on the entire mass of the filler, and the filler is included at 5% to 85% by mass based on an entire mass of the composition.

\* \* \* \* \*